Patented Aug. 24, 1954

2,687,396

UNITED STATES PATENT OFFICE 2,687,396

COMPOSITION OF SILICON-ALKYD RESIN, AN EPOXY RESIN, AND A PHENOL-FORMALDEHYDE RESIN

William Malcolm McLean, Midland, Mich., assignor to Dow Corning Corporation, Midland, Mich., a corporation of Michigan No Drawing. Application July 14, 1952, Serial No. 298,852

2 Claims. (Cl. 260—44)

This invention relates to resins comprising the three following components: a silicone-alkyd resin, an epichlorohydrin-bisphenol resin, and a phenol-formaldehyde resin.

In the applicant's copending application, filed concurrently herewith, there is disclosed and claimed resins comprising the combination of silicone-alkyd resins and epichlorohydrin-bisphenol resins (hereinafter referred to as epoxide resins). These materials have been found to be eminently suitable for use as an enamel on "glass served" wire. The term "glass served" as used herein refers to wire which is encased in a glass fabric jacket. It has been found that further outstanding improvements are obtained by incorporating a phenolic resin in the compositions of said application.

It is the object of this invention to provide improved high temperature magnet wire enamels for use on "glass served" electrical conductors. It is a further object of this invention to provide improved coatings for metallic surfaces.

This invention relates to resinous compositions comprising:

1. From 60 to 80 percent by weight of the reaction residue of
   (a) from 40 to 80 per cent by weight of a silicon compound of the formula

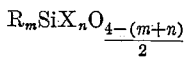

(b) from 10 to 40 per cent by weight of terephthalic or isophthalic acids or lower alkyl esters thereof, and
   (c) from 9 to 35 per cent by weight glycerine;
2. From 10 to 30 per cent by weight of the reaction residue of epichlorohydrin and bis-p,p'-hydroxyphenyldimethylmethane, said residue having an epoxy equivalent of at least 450, and,
3. From 5 to 20 per cent by weight of a phenol-formaldehyde resin.

The above compositions are prepared by blending the silicone-alkyd, epoxide and phenolic resins in the proportions above indicated. This blending may be carried out in any suitable manner. It is often advantageous to warm the mixture in order to facilitate homogeneity.

The silicone-alkyd resins employed in this invention are prepared by reacting the defined organosilicon compounds with the defined acids or esters and glycerine. In general, the reaction is carried out by heating mixtures of the materials at temperatures of from 100° C. to 280° C. During the reaction, the acids or esters and the glycerine condense to form a glyceride with the elimination of water or alcohol. The organosilicon compounds react with the glycerine hydroxyls to split out alcohols or water. The above reaction is best carried out in suitable solvents which include such materials as isophorone and cresylic acid.

The organosilicon compounds employed in this invention are of the formula

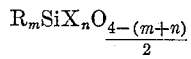

where R is an alkyl radical of less than 5 carbon atoms or a phenyl radical, X is an alkoxy radical or OH, $m$ has an average value of from 1 to 2, $n$ has an average value of from .01 to 3, and the sum of $(m+n)$ is not greater than 4. The above organosilicon compounds include both monomeric alkoxysilanes and silanols of the formula $R_mSiX_{4-m}$ and partial condensates thereof. These partial condensates are polymeric siloxanes having hydrocarbon groups, alkoxy groups and/or OH radicals attached to the silicon. The number of functional (i. e. X) groups per silicon may vary from 1 functional group per 100 silicons to 3 functional groups per silicon. Both the above silanes and the partial condensates are known materials.

The hydrocarbon groups may be alkyl radicals such as methyl, ethyl, propyl, and butyl or phenyl radicals. Any alkoxy group may be present in the silanes although it is preferred that the alkoxy radicals contain less than 5 carbon atoms, since the corresponding alcohols are more easily removed from reaction mixture.

Specific silanes which may be employed in this invention are, for example, phenylmethyldiethoxysilane, phenyltrimethoxysilane, dimethyldiisopropoxysilane, diethyldibutoxysilane, monomethyltriisopropoxysilane, diphenylsilanediol, phenylmethylsilanediol and diethysilanediol. It is understood that either individual silanes or mixtures of one or more silanes may be employed together with partial condensates of individual silanes or mixed silanes. These partial condensates are the preferred starting material.

The acids employed in this invention are terephthalic and isophthalic acids together with their lower alkyl esters. Thus examples of acid compounds which are operative in this invention are dimethylterephthalate, diethylterephthalate, dimethylisophthalate, monomethylisophthalate, monobutylterephthalate, terephthalic acid and isophthalic acid or mixtures of any of the above acids and esters.

The epoxide resins employed in this invention are formed by the condensation of epichlorohydrin and bis - p,p' - hydroxyphenyldimethylmethane in the presence of NaOH. During condensation HCl or NaCl is split out to form polyethers which have epoxy groups on the end of the chain. The degree of polymerization is expressed in terms of epoxy equivalents. The term "epoxy equivalent" is defined as the weight of the resin in grams containing one gram equivalent weight of epoxy group. The resins are represented by the formula

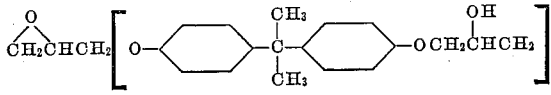

where $n$ is an integer. Thus it can be seen that the higher the epoxy equivalent, the higher will be the degree of polymerization of the resin.

Resins of the above type are available commercially. One brand of such resins is sold by the Shell Chemical Corporation under the name "Epon."

Any phenol-formaldehyde resin is operative in this invention. It has been found that both heat reactive and non-heat reactive resins (i. e. thermo-setting and non-thermo-setting resins) and both oil reactive and non-oil reactive resins are operative. The term "phenol" includes besides phenol itself, phenol derivatives such as cresol, paraphenylphenol, xylenol, ethylphenols, salicyclic acid, resorcinol and chlorinated phenols.

The blended resins of this invention are particularly adaptable for coating compounds due to a combination of hardness, flexibility, thermal stability, solvent resistance and good coating characteristics. They are particularly unique in that the hardness of the film increases upon standing at room temperature. This increase in hardness does not deleteriously affect the other desirable properties such as flexibility. These resins may be employed on metallic surfaces to give protective coatings. They are particularly beneficial for use in connection with "glass served" electrical conductors employed in the winding of motors.

Normally the resins are applied to the conductor by dipping. The coated conductor is then passed through a tower where it is heated at a temperature from 300° C. to 400° C. Upon emerging from the tower the resin is cured and the conductor is ready for use.

The following examples are illustrative only and are not to be construed as limiting the invention which is properly set forth in the appended claims:

*Example 1*

210 parts by weight of glycerine, 261 parts by weight of dimethylterephthalate and 35 parts by weight isophorone were heated at a temperature from 191° C. to 210° C. for 2½ hours. During this time the theoretical amount of methanol was evolved. The reaction mixture was cooled to less than 130° C. and 935 parts by weight of cresylic acid and 588 parts by weight of a partially condensed alkoxy silane were added. The partially condensed alkoxy silane had the composition 67 mol per cent phenylmethylsiloxane and 33 mol per cent monophenylsiloxane. The material contained 20 per cent by weight silicon bonded methoxy groups. The mixture was heated at 160° C. to 200° C. for 8 hours. It was then cooled and filtered.

70 parts by weight of the above resin was mixed with 20 parts by weight of an epoxide resin having an epoxy equivalent of from 1600 to 1900 which resin is sold by Shell Chemical Corporation under the name "Epon No. 1007," and with 10 parts by weight of a cresol-formaldehyde resin sold by Monsanto Chemical Company under the name "Resinox 455B." The resulting mixture was warmed in order to facilitate blending of the resins.

The resulting material was then applied to a "glass served" copper wire and the wire was

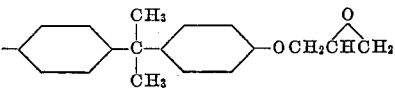

thereafter passed through a tower at the rate of 10 feet per minute while the tower was maintained at a temperature of 300° C. to 400° C. The dipping and curing were repeated 4 times. The resulting coating had a scrape of 58 cycles when tested in accordance with Joint Army Navy Specification W-583, Amendment 3, dated July 9, 1951. After standing at room temperature for 140 days, the scrape was 252 cycles.

A silicone-alkyd resin containing no epoxide resin or phenolic resin was tested as above. The scrape was 26 cycles.

*Example 2*

Equivalent results are obtained when isophthalic acid is substituted for the dimethylterephthalate in the procedure of Example 1.

*Example 3*

Equivalent results are obtained when a hydroxylated siloxane containing about 1 silicon bonded OH per silicon atom and having a composition 70 mol per cent phenylmethylsiloxane and 30 mol per cent monophenylsiloxane, is employed in the procedure of Example 1.

That which is claimed is:

1. A resinous composition consisting essentially of: (1) From 60 to 80 per cent by weight of the reaction product of (a) from 40 to 80 per cent by weight of an organosilicon compound of the formula

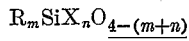

where R is of the group consisting of alkyl radicals of less than 5 carbon atoms and phenyl radicals, X is of the group consisting of alkoxy and hydroxy radicals, $m$ has an average value of from 1 to 2, $n$ has an average value of from .01 to 3 and the sum of $(m+n)$ is not greater than 4, (b) from 10 to 40 per cent by weight of a compound of the group consisting of terephthalic and isophthalic acids and lower alkyl esters thereof, and, (c) from 9 to 35 per cent by weight glycerine; (2) from 10 to 30 per cent by weight of the condensation product of epichlorohydrin and bis-p,p' - hydroxyphenyldimethylmethane, said resinous product having an epoxy equivalent of at least 450, and; (3) from 5 to 20 per cent by weight of a phenol-formaldehyde resin.

2. A resinous composition in accordance with claim 1 wherein component (3) is a cresol-formaldehyde resin.

References Cited in the file of this patent

UNITED STATES PATENTS

| Number | Name | Date |
|---|---|---|
| 2,587,295 | Doyle et al. | Feb. 26, 1952 |

OTHER REFERENCES

Paint, Oil and Chem. Review, vol. 113, No. 23, November 9, 1950, pp. 15–18, 48 and 49.

Glaser, Official Digest, No. 305, June 1950, pp. 418 and 437–442.